(No Model.)
M. McCORMICK.
SULKY.
No. 504,048. Patented Aug. 29, 1893.
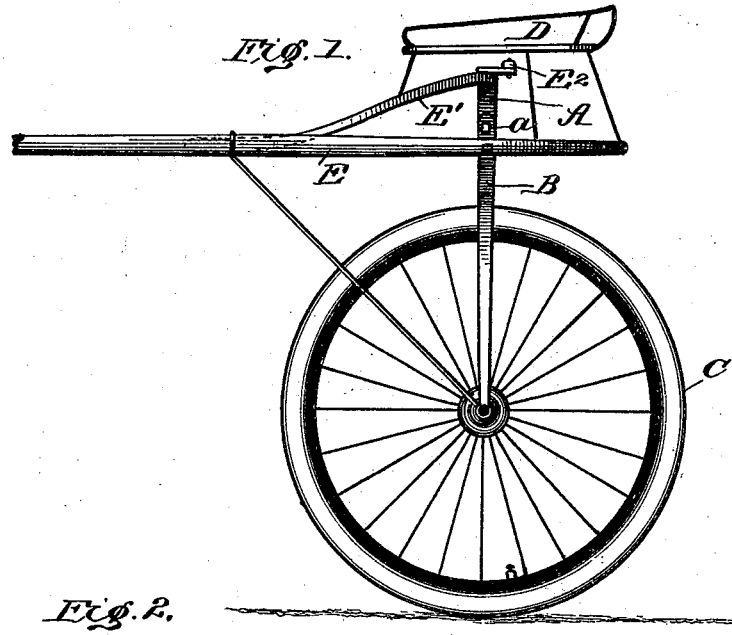
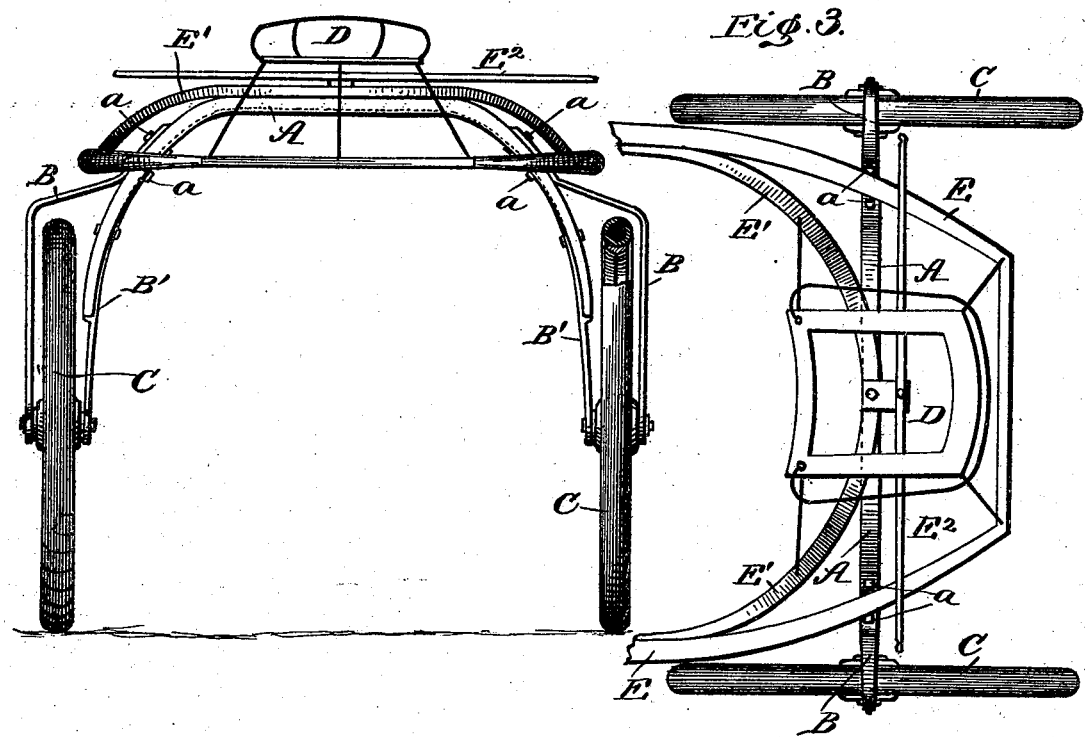
WITNESSES:
Jos. A. Ryan
Edw. W. Byrn.
INVENTOR
Moses McCormick
BY Munn & Co
ATTORNEYS.

UNITED STATES PATENT OFFICE.

MOSES McCORMICK, OF BALTIMORE, MARYLAND.

SULKY.

SPECIFICATION forming part of Letters Patent No. 504,048, dated August 29, 1893.

Application filed September 16, 1892. Serial No. 446,080. (No model.)

*To all whom it may concern:*

Be it known that I, MOSES MCCORMICK, of Baltimore city, in the State of Maryland, have invented a new and useful Improvement in Pneumatic Sulkies, of which the following is a specification.

My invention is in the nature of a track or trotting sulky having wheels with what is known as pneumatic tires—*i. e.*, tires formed of tubular rubber filled with air and hermetically sealed so as to form a peripheral cushion.

My invention consists in the peculiar construction and arrangement of the parts of the sulky provided with such pneumatic wheels as will be hereinafter fully described.

Figure 1 is a side elevation; Fig. 2, a rear elevation with the tire in section; and Fig. 3 is a plan view partly broken away of my improved pneumatic sulky.

In the drawings E represents the shaft; D the driver's seat; E' the circle brace; and E² the single-tree of an ordinary form of trotting sulky.

In constructing the axle A it is made preferably of wood for lightness and is arched upwardly in the middle with its two ends bent downwardly into a nearly vertical position. Upon opposite sides of these downwardly bent ends of the axle are bolted the metal bars B B' which are firmly connected to each other and also to the axle by the bolts $a$ $a$. One of these bars descends upon the outside of the wheel, and the other upon the inside, and at their lower ends they are connected to the opposite ends of the short independent axles of the wheels. The wheel itself is formed in a manner already well known and extensively used in bicycles, with a concave tire holding upon its periphery a circular tubular air cushion of soft rubber, or other suitable material.

The diameter of the sulky wheels is made much less than those of the ordinary sulky, so that the driver's seat is elevated considerably above the tops of the wheels. The axle A also rises in the middle to a point above the level of the shafts thus forming an arch of greater pitch and stiffness, and strengthening and bracing the frame work, and at the same time bringing the seat, shafts, and small pneumatic wheels in proper relation to each other and the horse.

The advantages of a pnematic wheeled sulky are that it adheres to the road better and does not vibrate, slip, or slide sidewise in turning curves. It also runs easier, enabling the horse to make faster time, and in being elastic contributes to the ease and comfort of the driver, and reduces the risk of pitching the driver in running over obstructions.

I am aware that it is not broadly new to apply a pneumatic wheel to a sulky, the method being to simply use the old axle and attach to the horizontal axle arm two vertical bars running down on opposite sides of the wheel. This permits only a very small wheel to be used, and is at best only a make-shift.

Having thus described my invention, what I claim as new, and desire to secure by Letters Patent, is—

1. In a trotting sulky the combination of the arched axle having downwardly bent ends, the two metal bars B B' bolted together at their upper ends upon opposite sides of the downwardly bent ends of the axles, and the wheels with cushioned tires having their individual axles connected to the lower ends of the said bars substantially as shown and described.

2. The arched axle A having its upward bend rising above the level of the shafts; in combination with the shafts, and the two metal bars B B' bolted to opposite sides of the downwardly bent ends of the axles, and the pneumatic-tired wheel arranged between the said bars substantially as shown and described.

MOSES McCORMICK.

Witnesses:
 JNO. T. MADDOX,
 ROBERT W. HAYS.